(12) United States Patent
Sesum et al.

(10) Patent No.: US 9,965,444 B2
(45) Date of Patent: May 8, 2018

(54) VECTOR GRAPHICS CLASSIFICATION ENGINE

(71) Applicant: Microsoft Technology Licensing, LLC., Redmond, WA (US)

(72) Inventors: Milan Sesum, Belgrade (RS); Milos Raskovic, Belgrade (RS); Drazen Zaric, Belgrade (RS); Milos Lazarevic, Belgrade (RS); Aljosa Obuljen, Belgrade (RS)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 309 days.

(21) Appl. No.: 14/605,974

(22) Filed: Jan. 26, 2015

(65) Prior Publication Data

US 2015/0135047 A1    May 14, 2015

Related U.S. Application Data

(63) Continuation of application No. 13/521,340, filed as application No. PCT/EP2012/000287 on Jan. 23, 2012, now Pat. No. 8,942,489.

(51) Int. Cl.
*G06F 17/21*    (2006.01)
*G06K 9/00*     (2006.01)

(52) U.S. Cl.
CPC ........ *G06F 17/211* (2013.01); *G06K 9/00469* (2013.01)

(58) Field of Classification Search
CPC .................... G06F 17/211; G06K 9/00469
See application file for complete search history.

(56) References Cited

U.S. PATENT DOCUMENTS

| | | | |
|---|---|---|---|
| 4,503,515 | A | 3/1985 | Cuan et al. |
| 4,648,067 | A | 3/1987 | Repass et al. |
| 5,111,397 | A | 5/1992 | Chirokas et al. |
| 5,574,802 | A | 11/1996 | Ozaki |

(Continued)

FOREIGN PATENT DOCUMENTS

| CN | 1609846 A | 4/2005 |
|---|---|---|
| CN | 101375278 | 2/2009 |

(Continued)

OTHER PUBLICATIONS

Chao, et al., "Layout and Content Extraction for PDF Documents", Computer Science, Jan. 1, 2004, pp. 213-224, vol. 3163, Springer, Verlag Berlin & Heidelberg.

(Continued)

*Primary Examiner* — David F Dunphy
(74) *Attorney, Agent, or Firm* — Merchant & Gould P.C.

(57) ABSTRACT

A vector graphics classification engine and associated method for classifying vector graphics in a fixed format document is described herein and illustrated in the accompanying figures. The vector graphics classification engine defines a pipeline for categorizing vector graphics parsed from the fixed format document as font, text, paragraph, table, and page effects, such as shading, borders, underlines, and strikethroughs. Vector graphics that are not otherwise classified are designated as basic graphics. By sequencing the detection operations in a selected order, misclassification is minimized or eliminated.

22 Claims, 8 Drawing Sheets

(56) References Cited

U.S. PATENT DOCUMENTS

| | | | |
|---|---|---|---|
| 5,737,442 A | | 4/1998 | Alam et al. |
| 5,784,487 A | | 7/1998 | Cooperman |
| 5,870,767 A | | 2/1999 | Kraft, IV |
| 6,115,497 A | * | 9/2000 | Vaezi ............... G06K 9/00456 382/168 |
| 6,173,073 B1 | | 1/2001 | Wang |
| 6,289,121 B1 | | 9/2001 | Abe et al. |
| 6,336,124 B1 | | 1/2002 | Alam et al. |
| 6,360,011 B1 | | 3/2002 | Katsumata et al. |
| 6,377,704 B1 | | 4/2002 | Cooperman |
| 6,493,694 B1 | | 12/2002 | Xu et al. |
| 6,915,484 B1 | | 7/2005 | Ayers et al. |
| 7,027,071 B2 | | 4/2006 | Chao |
| 7,307,642 B2 | | 12/2007 | Sack et al. |
| 7,418,652 B2 | | 8/2008 | Ornstein et al. |
| 7,644,356 B2 | | 1/2010 | Atkins et al. |
| 7,676,741 B2 | | 3/2010 | McGatha et al. |
| 7,715,635 B1 | | 5/2010 | Shagam et al. |
| 7,788,580 B1 | | 8/2010 | Goodwin et al. |
| 8,014,013 B2 | | 9/2011 | Owen et al. |
| 8,023,738 B1 | | 9/2011 | Goodwin et al. |
| 8,023,740 B2 | | 9/2011 | Dejean |
| 8,024,648 B2 | | 9/2011 | Foehr et al. |
| 8,200,009 B2 | | 6/2012 | Lin |
| 8,254,681 B1 | | 8/2012 | Poncin et al. |
| 8,249,356 B1 | | 9/2012 | Smith |
| 8,276,090 B2 | | 9/2012 | Chen et al. |
| 8,443,278 B2 | | 5/2013 | Mansfield et al. |
| 8,718,364 B2 | | 5/2014 | Enomoto |
| 8,942,489 B2 | | 1/2015 | Sesum |
| 9,042,653 B2 | | 5/2015 | Lin et al. |
| 9,081,412 B2 | | 7/2015 | Kompalli et al. |
| 9,251,413 B2 | | 2/2016 | Meier et al. |
| 9,703,759 B2 | | 7/2017 | Zaric et al. |
| 2002/0004713 A1 | | 1/2002 | Wakabayashi et al. |
| 2002/0073035 A1 | | 6/2002 | Saito |
| 2002/0181779 A1 | | 12/2002 | Hansen |
| 2003/0167271 A1 | | 9/2003 | Arnold et al. |
| 2004/0093355 A1 | | 5/2004 | Stinger |
| 2004/0146199 A1 | | 7/2004 | Berkner et al. |
| 2004/0205568 A1 | | 10/2004 | Breuel et al. |
| 2004/0205681 A1 | | 10/2004 | Nozuyama |
| 2004/0240735 A1 | | 12/2004 | Medina |
| 2005/0188303 A1 | | 8/2005 | Ayers et al. |
| 2006/0147117 A1 | | 7/2006 | Wakeam et al. |
| 2006/0242166 A1 | | 10/2006 | Larcheveque et al. |
| 2006/0288278 A1 | | 12/2006 | Kobayashi |
| 2007/0035780 A1 | | 2/2007 | Kanno |
| 2007/0079236 A1 | | 4/2007 | Schrier et al. |
| 2007/0174761 A1 | | 7/2007 | Lin et al. |
| 2007/0177183 A1 | | 8/2007 | Robinson et al. |
| 2007/0234203 A1 | | 10/2007 | Shagam |
| 2007/0237428 A1 | | 10/2007 | Goodwin et al. |
| 2008/0123945 A1 | | 5/2008 | Andrew et al. |
| 2009/0110288 A1 | | 4/2009 | Fujiwara |
| 2009/0119578 A1 | | 5/2009 | Relyea et al. |
| 2009/0144614 A1 | | 6/2009 | Dresevic et al. |
| 2010/0174732 A1 | | 7/2010 | Levy et al. |
| 2010/0211866 A1 | | 8/2010 | Nicholas et al. |
| 2010/0254604 A1 | | 10/2010 | Prabhakara et al. |
| 2010/0306260 A1 | | 12/2010 | Dejean |
| 2011/0289395 A1 | | 11/2011 | Breuel et al. |
| 2012/0039536 A1 | | 2/2012 | Dejean et al. |
| 2012/0096345 A1 | | 4/2012 | Ho et al. |
| 2012/0102388 A1 | | 4/2012 | Fan |
| 2012/0128249 A1 | | 5/2012 | Panjwani |
| 2012/0189203 A1 | | 7/2012 | Lin et al. |
| 2012/0311426 A1 | | 12/2012 | Desai et al. |
| 2012/0317470 A1 | | 12/2012 | Dejean |
| 2012/0324341 A1 | * | 12/2012 | Dejean ............... G06F 17/211 715/243 |
| 2013/0067313 A1 | * | 3/2013 | Leguin ............... G06F 17/21 715/234 |
| 2013/0191715 A1 | | 7/2013 | Raskovic et al. |
| 2013/0191732 A1 | | 7/2013 | Lazarevic et al. |
| 2013/0198599 A1 | | 8/2013 | Kumar et al. |
| 2013/0223743 A1 | | 8/2013 | Deryagin et al. |
| 2014/0108897 A1 | | 4/2014 | Boutelle et al. |
| 2014/0208191 A1 | | 7/2014 | Zaric et al. |
| 2015/0262007 A1 | | 9/2015 | Sesum et al. |
| 2016/0026858 A1 | | 1/2016 | Vogel |
| 2016/0371244 A1 | | 12/2016 | Chakra et al. |
| 2017/0220858 A1 | | 8/2017 | Stitz et al. |

FOREIGN PATENT DOCUMENTS

| | | |
|---|---|---|
| CN | 102105862 | 6/2011 |
| CN | 102301377 | 12/2011 |
| EP | 0779593 | 6/1997 |
| EP | 1 635 268 A2 | 3/2006 |
| EP | 2343670 | 7/2011 |
| JP | S63304387 | 12/1988 |
| JP | H08185476 | 7/1996 |
| JP | H09171556 | 6/1997 |
| JP | 2000105836 | 4/2000 |

OTHER PUBLICATIONS

Golovchinsky, et al., "Moving Markup: Repositioning Freeform Annotations", In: Proceedings of the 15th Annual ACM Symposium on User Interface Software and Technology (Paris, France, Oct. 27-30, 2002), pp. 21-29.

Hirano, et al., "Text and Layout Information Extraction from Document Files of Various Formats Based on the Analysis of Page Description Language", In: Proceedings of Ninth International Conference on Document Analysis and Recognition, Sep. 23, 2007, 5 pages.

International Search Report and the Written Opinion of the International Searching Authority for PCT/EP2012/000287 dated Oct. 25, 2012.

Liang, et al., "Document Layout Structure Extraction Using Bounding Boxes of Different Entities", In: Proceedings of 3rd IEEE Workshop on Applications of Computer Vision, Dec. 2, 1996, pp. 278-283.

Malleron, et al., "Text Lines and Snippets Extraction for 19th Century Handwriting Documents Layout Analysis", In: Proceedings of 10th International Conference on Document Analysis and Recognition, Jul. 26, 2009, pp. 1001-1005.

Ramakrishnan, et al., "Layout-Aware Text Extraction from Full-Text PDF of Scientific Articles", Source Code for Biology and Medicine, May 28, 2012, 21 pages, 7:7, BioMed Central, UK.

Ramel, et al., "Detection, Extraction and Representation of Tables", In: Proceedings of Seventh International Conference on Document Analysis and Recognition, Aug. 3, 2003, 5 pages.

"First Office Action and Search Report Issued in Chinese Patent Application No. 201280067911.5", dated Oct. 8, 2016, 12 Pages.

Xiong, Zhanzhi, "Research on SVG-Based Vector Graphics Editing Systems", In Journal, China Science Periodical Database, Apr. 8, 2004.

Chinese Second Office Action Issued in Patent Application No. 201280067911.5, dated Mar. 17, 2017. 5 Pages.

U.S. Appl. No. 13/521,340, Office action dated Mar. 21, 2014. 27 pages.

U.S. Appl. No. 13/521,340, Notice of Allowance dated Sep. 11, 2014. 7 pages.

"ABBYY Fine Reader, Version 12, User's Guide", https://www.abbyy.com/media/4712/guide_english.pdf, 2013, 116 pages.

"ABBYY FineReader 9.0 Sprint", http://www.abbyy.com/finereader/sprint-9/faq, Feb. 19, 2016, 8 pages.

"Can you convert a PDF table with Row and Column structure retaining in Excel?", http://www.a-pdf.com/faq/can-you-convert-a-pdf-table-with-row-and-column-structure-retaining-in-excel.htm, Jan. 14, 2010, 1 page.

"Chapter 16: Footnotes", http://www.sagehill.net/docbookxsl/Footnotes.html, Nov. 20, 2012, 2 pages.

"Convert PDF and JPG Files to Microsoft Word and Excel", https://finereaderonline.com/en-us, Jul. 23, 2014, 2 pages.

(56) References Cited

OTHER PUBLICATIONS

"Convert Scanned PDF to Word", http://www.onlineocr.net, Jun. 25, 2014, 1 page.
"Footnotes and Endnotes", http://word.tips.net/C0066_Footnotes_and_Endnotes.html, Nov. 20, 2012, 6 pages.
"Introduction to Optical Character Recognition Software", http://www.simpleocr.com/OCR_software_guide, Aug. 18, 2015, 17 pages.
"OCR to Excel", http://www.simpleocr.com/OCT_to_Excel, Aug. 20, 2015, 7 pages.
Baird, "Anatomy of a Versatile Page Reader", Proceedings in the IEEE, IEEE, New York, Jul. 1, 1992, 8 pages.
Borstein, "Exporting a PDF to Excel", http://blogs.adobe.com/acrolaw/2009/04/exporting-a-pdf-to-excel, Apr. 7, 2009, 3 pages.
Cesarini et al., "Structured Document Segmentation and Representation by the Modified X-Y-tree", Proceedings of the Fifth International Conference on Document Analysis and Recognition, ICDAR 99, pp. 563-566.
Cesarini et al., "Trainable table location in document images," Pattern Recognition, Proceedings, 16th International Conference on Quebec City, Aug. 11, 2002, 6 pages.
Chinese Notice of Allowance in Application 201280067911.5, dated May 3, 2017, 4 pages.
Douglas et al., "Using Natural Language Processing for Identifying and Interpreting Tables in Plain Text", Fourth Annual Symposium on Document Analysis and Information Retrieval, Apr. 1, 1995, 15 pages.
Duygulu et al., "A hierarchical representation of form documents for identification and retrieval", International Journal on Document Analysis and Recognition, vol. 5, 2002, pp. 17-27.
Embley et al., "Table-processing Paradigms: a Research Survey", In International Journal of Document Analysis, May 9, 2006, 21 pages.
Fang et al., "A Table Detection Method for Multipage PDF Documents via Visual Separators and Tabular Structures", In Proceedings of International Conference on Document Analysis and Recognition, Sep. 18, 2011, 5 pages.
Glushko "Design Issues for Multi-Document Hypertexts", In Proceedings of Hypertext, http://couses.ischool.berkley.edu/i290-f/s02/readings/glushko_multidocs.pdf, Nov. 1989, 10 pages.
Hirayama, "A Block Segmentation Method for Document Images with Complicated Column Structures", IEICE, Nov. 25, 1996, 11 pages.
Itonori, "Table Structure Recognition based on Textblock Arrangement and Ruled Line Position", In Proceedings of the Second International Conference on Document Analysis and Recognition, Oct. 20, 1993, 4 pages.
Lin et al., "Mathematical Formula Identification in PDF Documents", International Conference on Document Analysis and Recognition, IEEE, 2011, pp. 1419-1423.
Liu et al., "A Fast Preprocessing Method for Table Boundary Detection: Narrowing Down the Sparse Lines using Solely Coordinate Information", In Proceedings of the Eighth IAPR International Workshop on Document Analysis Systems, Sep. 16, 2008, 8 pages.
"Mini Image to Excel Table OCR Converter", http://www.minipdf.com/scan-to-excel/image-to-excel-table.html, Oct. 3, 2011, 3 pages.
Nagy et al., "A Prototype Document Image Analysis System for Technical Journals", Computer, vol. 25, No. 7, 1992, pp. 10-22.
PCT International Search Report and Written Opinion in PCT/EP2012/000287, dated Oct. 25, 2012, 10 pages.
Schrier et al., "Adaptive Layout for Dynamically Aggregated Documents", In proceedings of 13th International Conference on Intelligent User Interfaces, Jan. 13, 2008, 10 pages.
Silva et al., "Design of an end-to-end method to extract information from tables", International Journal of Document Analysis and Recognition, vol. 8, No. 2, Feb. 25, 2006, 28 pages.
Tersteegen et al., "Scantab: Table Recognition by Reference Tables", In Proceedings of Third IAPR Workshop on Document Analysis Systems, Nov. 4, 1998, 10 pages.
Wang, "Table Detection via Probability Optimization", Document Analysis Systems V, Jan. 1, 2002, 12 pages.
e Silva et al., "Design of an end-to-end method to extract information from tables," International Journal of Document Analysis and Recognition (IJDAR), 8(2-3), pp. 144-171, 2006.
Evans et al., "Using the New Photo Merge Panorama and Photo Merge HDR Tools in Adobe Photoshop Lightroom CC (2015 release)" Adobe Press, Retrieved from the Internet: <URL: http://adobepress.com/articles/printerfriendly/2339642>, Apr. 24, 2015, 3 pages.
ReadirisTM Pro 12, User Guide, 2010, 73 pages.
Wikipedia, "Comparison of optical character recognition software," Retrieved from the Internet: <URL: https://en.wikipedia.org/wiki/Comparison_of_optical_character_recognition_software>, retreived on Jan. 12, 2018 [in U.S. Appl. No. 15/420,647, filed Jan. 25, 2018], 5 pages.

* cited by examiner

| lorem | ipsum | dolor |
|---|---|---|
| sit | amet | consectetur |

VECTOR GRAPHICS CLASSIFICATION ENGINE

CROSS-REFERENCE TO RELATED APPLICATIONS

This application is a continuation of application Ser. No. 13/521,340, filed Jul. 10, 2012, and now assigned U.S. Pat. No. 8,942,489, which is the National Stage of International Application No. PCT/EP2012/000287, filed Jan. 23, 2012, of which the entire contents are hereby incorporated by reference.

BACKGROUND

Flow format documents and fixed format documents are widely used and have different purposes. Flow format documents organize a document using complex logical formatting structures such as sections, paragraphs, columns, and tables. As a result, flow format documents offer flexibility and easy modification making them suitable for tasks involving documents that are frequently updated or subject to significant editing. In contrast, fixed format documents organize a document using basic physical layout elements such as text runs, paths, and images to preserve the appearance of the original. Fixed format documents offer consistent and precise format layout making them suitable for tasks involving documents that are not frequently or extensively changed or where uniformity is desired. Examples of such tasks include document archival, high-quality reproduction, and source files for commercial publishing and printing. Fixed format documents are often created from flow format source documents. Fixed format documents also include digital reproductions (e.g., scans and photos) of physical (i.e., paper) documents.

In situations where editing of a fixed format document is desired but the flow format source document is not available, the fixed format document may be converted into a flow format document. Conversion involves parsing the fixed format document and transforming the basic physical layout elements from the fixed format document into the more complex logical elements used in a flow format document. Existing document converters faced with complex elements, such as vector graphics, resort to base techniques designed to preserve the visual fidelity of the layout (e.g., text frames, line spacing, and character spacing) at the expense of the flowability of the output document. The result is a limited flow format document that requires the user to perform substantial manual reconstruction to have a truly useful flow format document. It is with respect to these and other considerations that the present invention has been made.

BRIEF SUMMARY

The following Brief Summary is provided to introduce a selection of concepts in a simplified form that are further described below in the Detailed Description. This Brief Summary is not intended to identify key features or essential features of the claimed subject matter, nor is it intended to be used to limit the scope of the claimed subject matter.

One embodiment of the vector graphics classification method executed by the vector graphics classification engine defines a pipeline for classifying vector graphics in the data parsed from a fixed format document. In various embodiments, the vector graphics classification operations depend on the output of the preceding operations.

Beginning with text run shading detection, the vector graphics classification engine identifies closed paths and paths with fill using path information parsed directly from the fixed format document. The vector graphics classification engine analyzes the identified closed paths and paths for fill and determines those paths that appear to form rectangles and locates the text run, if any, that is contained within the rectangle. A rectangle containing fill and bounding a text run is classified as text run shading. Next, the vector graphics classification engine aggregates individual paths for separate lines into a composite line based on selected characteristics of the paths. Aggregating these related paths allows the vector graphics classification engine to analyze them as a single line. The vector graphics classification engine considers paths and path aggregations defining lines running in same direction as text runs as underline and strikethrough candidates. The vector graphics classification engine analyzes the text extracted from the fixed format document to see if the line satisfies the vertical and horizontal position constraints for the underline or the strikethrough. After classifying vector graphics elements corresponding to underlines or strikethroughs, the vector graphics classification engine analyzes the remaining vector graphics elements as potential text run borders. A rectangle that contains a text run but does not contain fill is considered as a potential text run border.

For table detection, the vector graphics classification engine groups the vector graphics elements into clusters based on their proximity and connectivity and to analyze the structure set formed by the lines. In order to form a regular table, the vector graphics classification engine ignores intersecting paths as most probably representing a diagram. Paragraph shading detection and paragraph border detection depend on the results of table detection. Table detection is performed in a manner that detects shaded paragraphs and bordered paragraphs as single cell tables. The vector graphics classification engine determines whether to maintain a single cell table as a table or to convert it to a shaded paragraph or a bordered paragraph based on the position of the table within the columns.

In various embodiments of the vector graphics classification method, page border detection and page shading (i.e., color) detection is accomplished using the same or similar techniques used for text run and/or paragraph shading, but applied to vector graphics containing all or substantially all of the area of a page.

Any vector graphics elements that cannot be otherwise classified by the vector graphics classification engine are considered basic graphic elements. The basic graphic elements are aggregated together to form pictures in the flow format document based on the connectivity or proximity of the individual paths. The vector graphics classification engine places the individual vector graphics elements into groups when the paths indicated the vector graphics elements are connected or are positioned less than a selected distance represented by a separation distance threshold.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

Further features, aspects, and advantages will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

A vector graphics classification engine and associated method for classifying vector graphics in a fixed format document is described herein and illustrated in the accompanying figures. The vector graphics classification engine defines a pipeline for categorizing vector graphics parsed from the fixed format document as font, text, paragraph, table, and page effects, such as shading, borders, underlines, and strikethroughs. Vector graphics that are not otherwise classified are designated as basic graphics. By sequencing the classification operations in a selected order, misclassification is reduced or eliminated.

Figure 1:
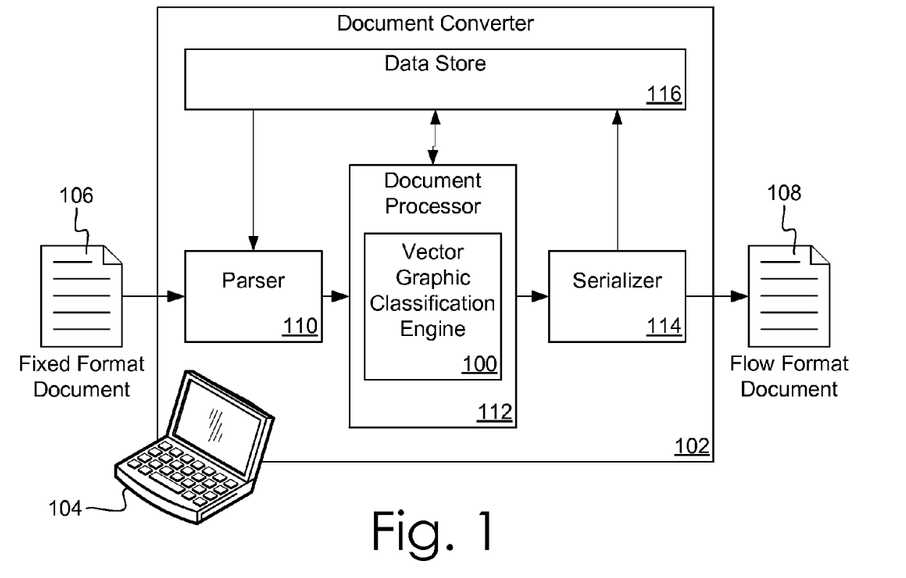
FIG. 1 is a block diagram showing one embodiment of a system including the vector graphics classification engine.

FIG. 1 is a system incorporating the vector graphics classification engine 100. In the illustrated embodiment, the vector graphics classification engine 100 operates as part of a document converter 102 executed on a computing device 104. The document converter 102 converts a fixed format document 106 into a flow format document 108 using a parser 110, a document processor 112, and a serializer 114. The parser 110 extracts data from the fixed format document 106. The data extracted from the fixed format document is written to a data store 116 accessible by the document processor 112 and the serializer 114. The document processor 112 analyzes and transforms the data into flowable elements using one or more detection and/or reconstruction engines (e.g., the vector graphics classification engine 100 of the present invention). Finally, the serializer 114 writes the flowable elements into a flowable document format (e.g., a word processing format).

Figure 2:
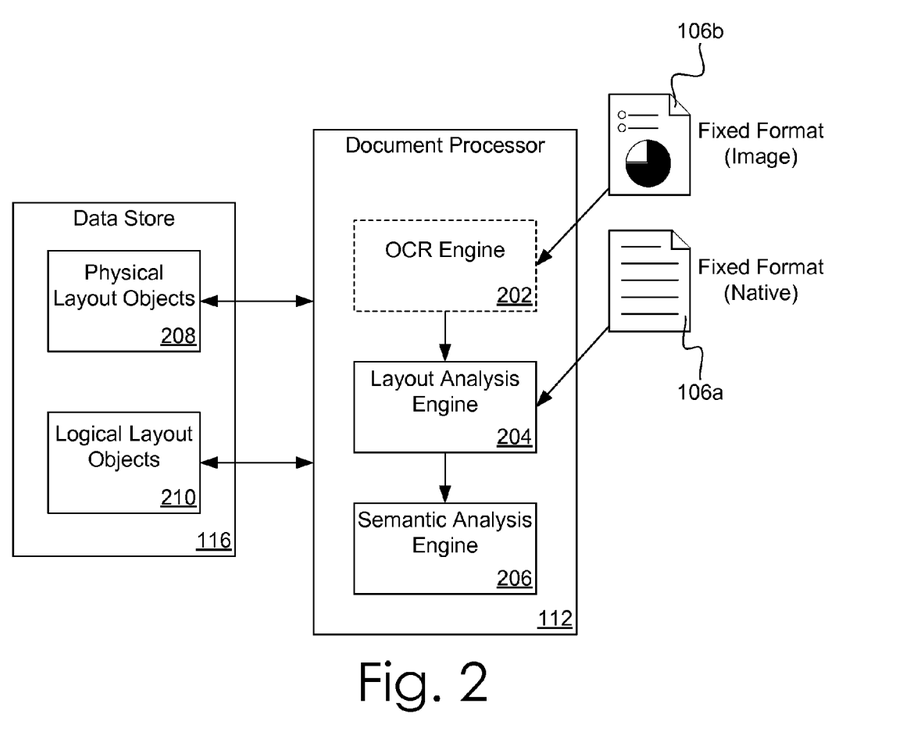
FIG. 2 is a block diagram showing the operational flow of one embodiment of the document processor.

FIG. 2 illustrates one embodiment of the operational flow of the document processor 112 in greater detail. The document processor 112 includes an optional optical character recognition (OCR) engine 202, a layout analysis engine 204, and a semantic analysis engine 206. The data contained in the data store 116 includes physical layout objects 208 and logical layout objects 210. In some embodiments, the physical layout objects 208 and logical layout objects 210 are hierarchically arranged in a tree-like array of groups (i.e., data objects). In various embodiments, a page is the top level group for the physical layout objects 208, and a section is the top level group for the logical layout objects 210. The data extracted from the fixed format document 106 is generally stored as physical layout objects 208 organized by the containing page in the fixed format document 106. The basic physical layout objects obtained from a fixed format document include text-runs, images, and paths. Text-runs are the text elements in page content streams specifying the positions where characters are drawn when displaying the fixed format document. Images are the raster images (i.e., pictures) stored in the fixed format document 106. Paths describe elements such as lines, curves (e.g., cubic Bezier curves), and text outlines used to construct vector graphics.

Where processing begins depends on the type of fixed format document 106 being parsed. A native fixed format document 106a created directly from a flow format source document contains the some or all of the basic physical layout elements. Generally, the data extracted from a native fixed format document 106a is available for immediate use by the document converter; although, in some instances, minor reformatting or other minor processor is applied to organize or standardize the data. In contrast, all information in an image-based fixed format document 106b created by digitally imaging a physical document (e.g., scanning or photographing) is stored as a series of page images with no additional data (i.e., no text-runs or paths). In this case, the optional optical character recognition engine 202 analyzes each page image and creates corresponding physical layout objects. Once the physical layout objects 208 are available, the layout analysis engine 204 determines the layout of the fixed format document and enriches the data store with new information (e.g., adds, removes, and updates the physical layout objects). After layout analysis is complete, the semantic analysis engine 206 enriches the data store with semantic information obtained from analysis of the physical layout objects and/or logical layout objects.

Figure 3A:
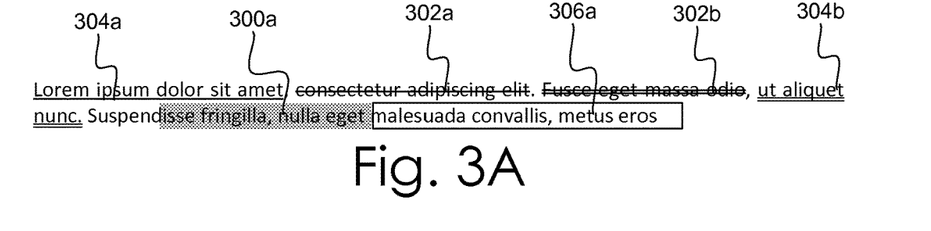
FIGS. 3A-3E illustrate various vector graphics elements that are capable of being classified by the vector graphics classification engine.
Figure 3B:
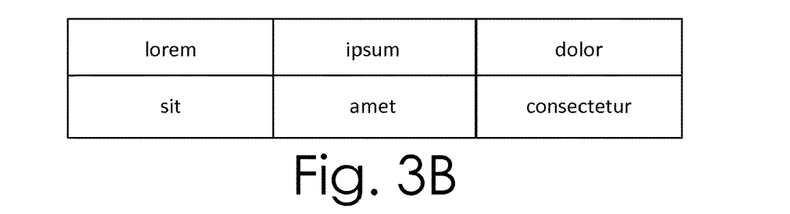
Figure 3C:
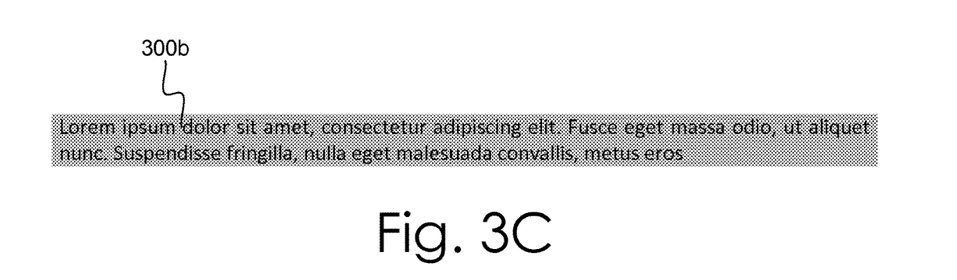
Figure 3D:
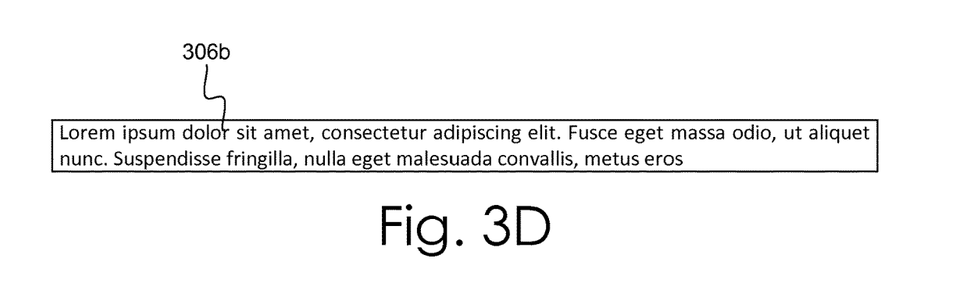
Figure 3E:
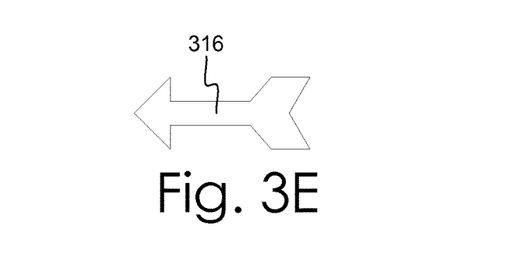

FIGS. 3A-3E illustrate examples of the types of vector graphics appearing in fixed format documents 106 that are capable of being classified by the vector graphics classification engine. FIGS. 3A-3D show various vector graphics that are associated with and modify text runs in the fixed format document 106. FIG. 3A illustrates examples of font and text run effects that appear as vector graphics in fixed format documents. The illustrated text includes the following text run and font effects: shading 300a, underline 304a, double underline 304b, strikethrough 302a, double strikethrough 302b, and border 306a. FIG. 3B illustrates an example of a table with borders that appear as vector graphics in a fixed format document 106. FIG. 3C illustrates an example of paragraph shading 300b that appears as a vector graphics in a fixed format document. FIG. 3D illustrates an example of a paragraph border 306b that appears as a vector graphic in a fixed format document. FIG. 3E illustrates an example of a basic graphic 316 (i.e., an image not associated with a text run) that appears as a vector graphic in a fixed format document.

A vector graphics element is described by path. Each path may include one or more sub-paths. In other words, each vector graphics element in a fixed format document is formed from one or more line segments described by paths. A vector graphics element that terminates at the same point from which it originates has a closed path. A closed path is capable of being filled. In various embodiments, some tolerance is allowed so that a vector graphics element that terminates substantially proximate to the point from which it originates will also be considered a closed path. In some embodiments, a path need not be closed to contain fill.

Figure 4:
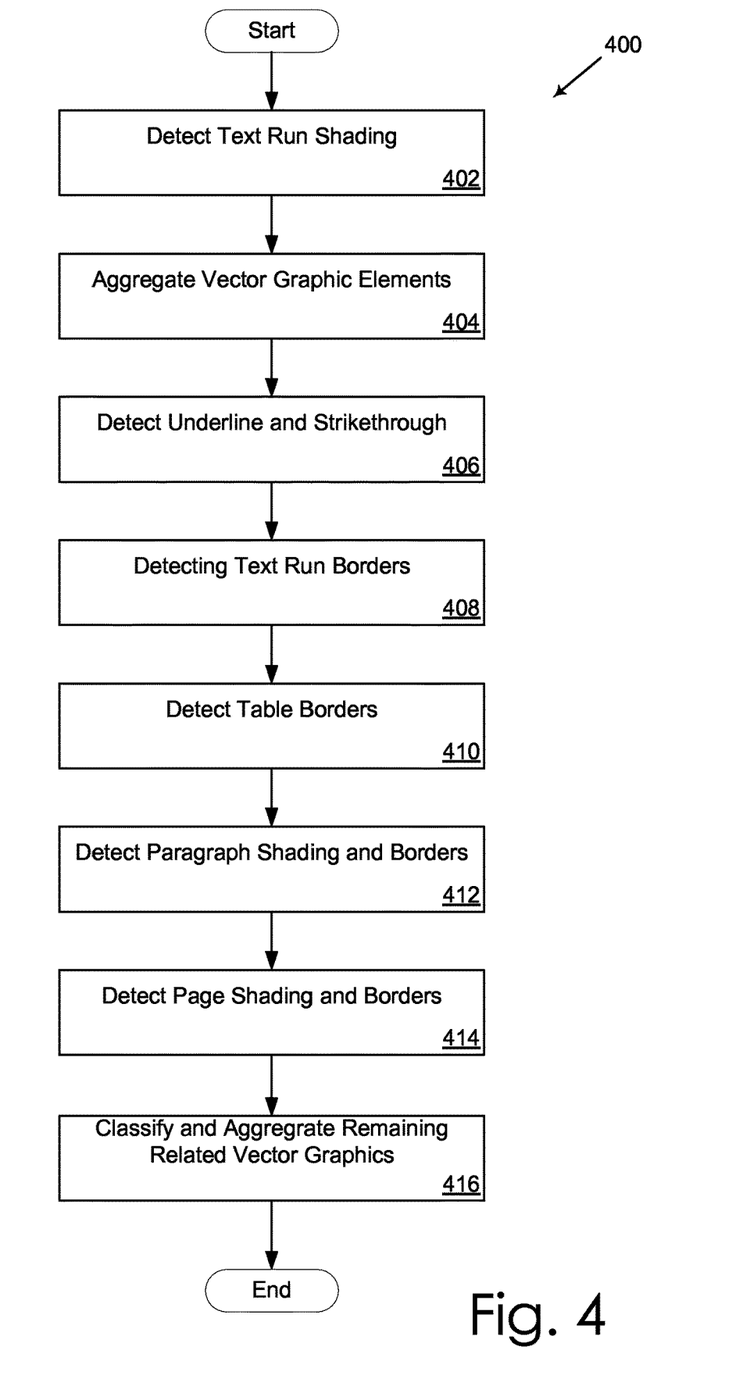
FIG. 4 is a flow chart of one embodiment of the vector graphics classification method executed by the vector graphics classification engine.

FIG. 4 is a flow diagram showing one embodiment of the vector graphics classification method 400 executed by the vector graphics classification engine 100. The vector graphics classification method 400 performed by the vector graphics classification engine classifies vector graphics in the data parsed from a fixed format document based on the relationship between the physical position of the shape defined by the path and the physical position of the corresponding text run(s). In various embodiments, the order of operations in the vector graphics classification method 400 impacts the accuracy and quality of the output produced by the vector graphics classification engine 100. Further, in various embodiments, the vector graphics classification operations depend on the output of the preceding operations. The illustrated embodiment of the vector graphics classification method 400 begins with the text run shading detection 402. Next, the vector graphics classification engine 100 aggregates 404 paths into path aggregations. The line segment aggregations are analyzed 406 as potential text effects including as an underline 304a and or a strikethrough 302a. Following underline and strikethrough analysis, the vector graphics classification engine 100 looks 408 for text run borders 306a. After looking for text run borders, a table border detection process 410 looks for vector graphics that potentially correspond to table borders. The output of the table detection process is used for paragraph shading detection and paragraph border detection 412. In some embodiments, the vector graphics classification method 400 concludes with page shading detection and paragraph border detection 414. Once all semantic information has been associated with the vector graphics, any vector graphics that have not been classified by the previous steps are classified as basic graphics and aggregated 416. The vector graphics classification method 400 attempts to form pictures from the basic graphics. The basic graphics do not carry any semantic information and are not associated with any text. In other words, the basic graphics represent pictures in the document.

During classification of shadings (and highlights) 402, the vector graphics classification engine 100 looks for closed shapes that contain fill. Generally, a shape will only contain fill if it is closed. In one embodiment, the vector graphics classification engine 100 looks for rectangles, which are commonly used to bound objects. In another embodiment, the vector graphics classification engine 100 for other shapes, in addition to rectangles. In various embodiments, the text run shading detection process includes additional criteria. In some embodiments, the rectangle (i.e., shading) height must be less than a selected threshold height. For example, some embodiments do not classify the vector graphics as text run shading where the rectangle height is more than twice the text run height, text run width, or average character width because a large rectangle dimension relative to the text run height increases the probability that the vector graphics represents shading for a paragraph or table element. In this case, the vector graphics element will be once again considered during a later phase of the vector graphics classification method 400. Such exemplary constraints on the text run shading detection process should not be considered to be exhaustive. In the illustrated embodiment, the shading classification occurs prior to the path aggregation step, and path(s) do not form a closed shape with fill are left to the basic graphic aggregation step. In another embodiment, the shading classification step occurs immediately following the path aggregation step. Some borders around shadings are constructed as a single closed shape without fill, while others are constructed using a rectangle with a very small height/width to form each edge. Accordingly, in some embodiments, path aggregation is used to identify borders formed from four rectangles. In various embodiments, the vector graphics classification engine depends on whitespace detection to discard candidates for text run shadings. During whitespace detection, the bounding boxes of areas on a page that contain only whitespace (i.e., do not contain text runs, images, and/or paths) are identified as whitespaces. All paths and path aggregations that form boxes with fill (potential highlights/shadings) are checked if they entirely intersect at least one whitespace. All paths that intersect whitespaces are excluded from further consideration as shadings.

Next, the vector graphics classification engine 100 aggregates 404 individual paths. Aggregating these related paths allows the vector graphics classification engine 100 to analyze them as a single line. Examples of lines defined by multiple paths include, without limitation, dashed, dotted, and broken lines. Paths are aggregated in the following manner. First, the average text run height on the page is determined and the maximum width of aggregation (i.e., the maximum line width) is set accordingly. A moving window is then used to iteratively aggregate all paths having a bounding box that fits into the window. For each iteration, the width of the window is increased by a selected increment from an initial line width to a maximum line width. Both horizontal and vertical aggregations are achieved by using horizontally and vertically moving windows, respectively. The vector graphics classification engine 100 analyzes the resulting aggregations splits those aggregations where the two paths are separated by a distance exceeding a maximum separation distance threshold. For example, in one embodiment, an aggregation containing separate underlines for a couple of words in the same line of on a page would be split.

As with shading detection, some embodiments of the vector graphics classification engine 100 use the whitespaces identified during whitespace detection to discard underline and strikethrough candidates. During underline and strikethrough classification 406, all paths and path aggregations that entirely intersect at least one whitespace are excluded from further consideration as a potential underline or strikethrough. Similarly, any horizontal aggregation that intersects a vertical path aggregation is also discarded as a potential underline or strikethrough due to a higher probability that such horizontal aggregation is a text or table border. All path aggregations that remain candidates to be underline or strikethroughs and corresponding text-runs (i.e., text runs with a physical location on the page proximate to the physical location of a path aggregation) are extracted into two separate arrays and sorted by position, top to bottom and left to right. For each path aggregation, the vector graphics classification engine 100 locates the first text run having a bounding box intersecting the bounding box of the path aggregation. If there are characters at the beginning of the text run that are not contained by the path aggregation (i.e., the bounding boxes do not intersect), the text-run is divided into text-runs and the portion of the text run that intersects the bounding box is retained. The analysis is iteratively performed for different types of lines including, but not limited to, underline and strikethrough. A vector graphic that has already been classified as differently (i.e., a shading) is skipped, while a vector graphic that has already been classified as an element in the same classification (i.e., another underline) is updated. For example, if the aggregated path is determined to be an underline for a text run with a single underline previously detected, the classification is changed from underline to double underline.

The vector graphics classification engine 100 analyzes the text run extracted from the fixed format document to see if the line satisfies the vertical and horizontal position constraints for the underline 304 or the strikethrough 302. By way of example, a line used for a strikethrough should intersect the associated text run at a height within a selected range relative to the text height and should not extend beyond the text run by more than a selected threshold length. In one embodiment, the vector graphics classification engine 100 looks for lines corresponding to strikethrough to be located between the upper fifth and the lower fifth of the text height and not extending too far on either the side of the text run. Similarly, the vertical position of a line potentially corresponding to an underline is constrained to be below the vertical position of text run. A line segment classified as an underline or a strikethrough is removed from the physical layout objects 208 because the semantic information for the associated text run will identify the text as strikethrough or underlined text. In situations where the semantic information of the associated text run does not indicate the text as strikethrough or underlined text, various embodiments of the vector graphics classification engine 100 update the semantic information as well.

After classifying vector graphics elements corresponding to underlines or strikethroughs, the vector graphics classification engine 100 analyzes 408 the remaining vector graphics elements as potential text run borders. Depending upon the producer of the native fixed format document, a text run border may be represented in a number of different ways. In some native fixed format documents, a text run border may be represented by a single closed path with four segments that define a rectangle. In other native fixed format documents, a text run border may be represented by a four separate paths that collectively define a rectangle. The vector graphics classification engine 100 analyzes the available paths to identify any combinations that define a rectangle (or other selected shape of interest). In various embodiments, the vector graphics classification engine 100 attempts to build rectangles during the line aggregation process, and any rectangles built during the line aggregation process are used in text run border detection. A rectangle that contains a text run but does not contain fill is classified as a potential text run border 306*a*. As with shading detection, some embodiment of the vector graphics classification engine 100 use the whitespaces identified during whitespace detection to discard text run border candidates. In some embodiments, the text run border detection is subject to the same or similar constraints for the size of the rectangle relative to the text run height previously described in relation to the text run shading detection.

For table detection 410, the vector graphics classification engine 100 groups the vector graphics elements into clusters based on their proximity and connectivity and to analyze the structure set formed by the lines. The vector graphics classification engine identifies tables within the document and provides additional regional information for region classification engine using vector graphics to identify the table borders. The final tables will be reconstructed later during table reconstruction. Detection for bordered tables and tables with partial borders is performed before region and paragraph detection.

The vector graphics classification engine 100 begins table detection by grouping the vector graphics on a page into clusters based on their connectivity. Clusters that are too small or do not have a rectangular perimeter are discarded.

Next, the vertical and horizontal segments of the vector graphics in the cluster are extracted and merged, as appropriate. The vector graphics classification engine 100 attempts to create column/row separators from vertical and horizontal segments, and also collect non-separator elements (non-straight, neither vertical nor horizontal). In various embodiments, additional criteria are applied including, but not limited to, checking the distribution of column/row separators for a certain pattern, checking that non-separator elements do not intersect with separators, verifying that the row height is not less than the height of the smallest text run in the table, and checking that the majority of the cells are not empty. Finally, the vector graphics classification engine 100 creates the individual cells from column/row separators and merges cells, if the original table contains merged cells. After the table and its cells are detected, table and cell aggregation nodes will be created in the data store, and region and paragraph detection will run on those nodes.

After detecting bordered tables, the vector graphics classification engine 100 detects tables with partial borders. The horizontal and vertical graphics lines, including the borders of filled rectangles, are extracted and grouped by length. In some embodiments, groups with less than three lines are excluded. Text runs are placed into the gaps between lines. Within the gap, the group text runs by connectivity. Rows with only one large text cluster across the whole table width are excluded from the table. This breaks groups into smaller groups. Once again, exclude any groups with less than two lines are discarded. Finally, the vector graphics classification engine 100 verifies that most of text between rows is aligned with the text in other rows using a threshold to account for some alignment variation.

Paragraph shading detection and paragraph border detection 412 depend on the results of table detection. Table detection is performed in a manner that detects shaded paragraphs and bordered paragraphs as single cell tables. Accordingly, all single cell tables are investigated as vector graphics potentially representing a paragraph border and/or paragraph shading. The vector graphics classification engine 100 determines whether to maintain a single cell table as a table or to convert it to a shaded paragraph 300*b* or a bordered paragraph 306*b* based on the position of the table within a column. If the table has vertical overlap with some text in the column, it is classified as out-of-flow object and will be left as table. If the table has no vertical overlap with any column content it can be reconstructed as paragraph with borders/shading. As such, the vector graphics classification engine 100 maintains the table or, in some embodiments, reconstructs the table as text box. Conversely, a single cell table within a column that has no text around it is reconstructed as a shaded paragraph (when the single cell table contains fill) or a bordered paragraph (when the single cell table does not contain fill). If a table is classified as paragraph border/shading, information about its borders/cell shading (bounding boxes and color information) is extracted and is stored in a separate vector for later use. All content from the table is extracted and returned to the appropriate physical layout node (e.g., the page node) and will be subject to further analysis (e.g., line detection and paragraph detection). After paragraphs are detected later in the pipeline, borders/shading data is matched with paragraphs and border/shading properties are assigned accordingly.

In various embodiments of the vector graphics classification method 400, page border detection and page shading (i.e., color) detection 414 is accomplished using the same or similar techniques used for text run and/or paragraph shading, but applied to vector graphics containing all or substantially all of a page. Page color is shading applied to an entire page instead of a couple of words or paragraphs. The approach used to classify vector graphics as page shading is largely similar to the approach used to classify vector graphics as text run shading. Page color is constructed using a single filled path covering the page and is assumed to have the lowest rendering order of all elements on the page. Because different producers can choose to cover different areas of the page (i.e., less than 100%), the vector graphics classification engine 100 analyzes the vector graphics using a threshold corresponding to page area coverage. If the vector graphics classification engine 100 identifies a single filled path with a page coverage area exceeding the threshold, that path is removed from the physical layout object and the page color property is stored in the data store. Similarly, a page border is a border applied to an entire page instead of a couple of words or paragraphs. Again, the approach used to classify vector graphics as a page border is largely similar to the approach used to classify vector graphics as a text run border. Because a page border is constructed as rectangle that takes up significant area of the page and a significant portion of page content, the vector graphics classification engine 100 uses a threshold value as part of the classification criteria.

After the vector graphics classification engine 100 completes all other classification steps, any remaining paths that have not been otherwise classified are classified 416 as basic graphics and aggregated into several clusters based on the connectivity or proximity of the individual paths. The vector graphics classification engine 100 places the individual vector graphics elements into groups when the paths indicated the vector graphics elements are connected or are positioned less than a selected distance represented by a proximity threshold. In various embodiments, the proximity threshold varies depending upon factors such as the area covered by the vector graphics elements on the page. In another embodiment, the proximity threshold varies inversely to the size of the bounding box of the path. The distance between two paths is determined as the length of the shortest straight line connecting their respective bounding boxes. If two paths have intersections, the distance between them is zero. After clustering the paths in this manner, all remaining elements of the fixed format document (i.e., text runs and images) contained within bounding box of the cluster are also added to it. Each group will then be serialized as a separate drawing canvas containing all of its drawing objects.

The vector graphics classification engine 100 and associated vector graphics classification method 400 described herein is useful to identify and classify distinct vector graphics appearing in a fixed format document and to transform any vector graphics classified by the vector graphics classification engine into a flow format element. While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

Figure 5:
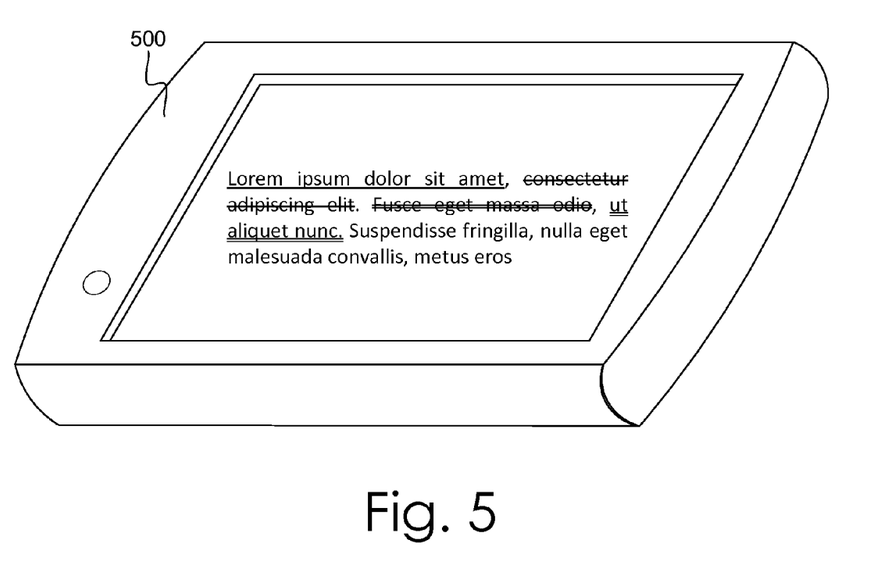
FIG. 5 illustrates one embodiment of a tablet computing device executing one embodiment of the vector graphics classification engine.
Figure 6:
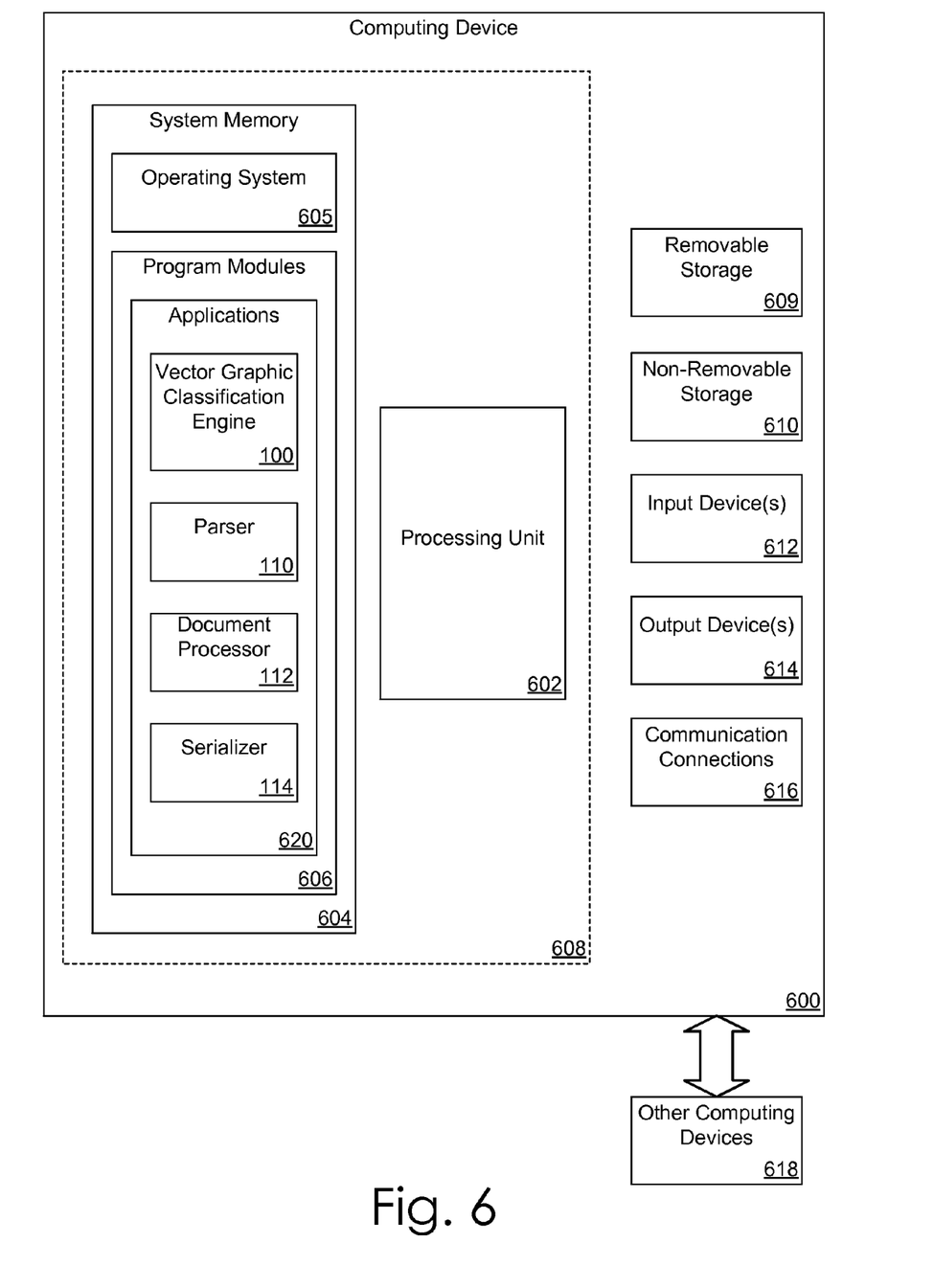
FIG. 6 is a simplified block diagram of one embodiment of a computing device with which embodiments of the present invention may be practiced.
Figure 7A:
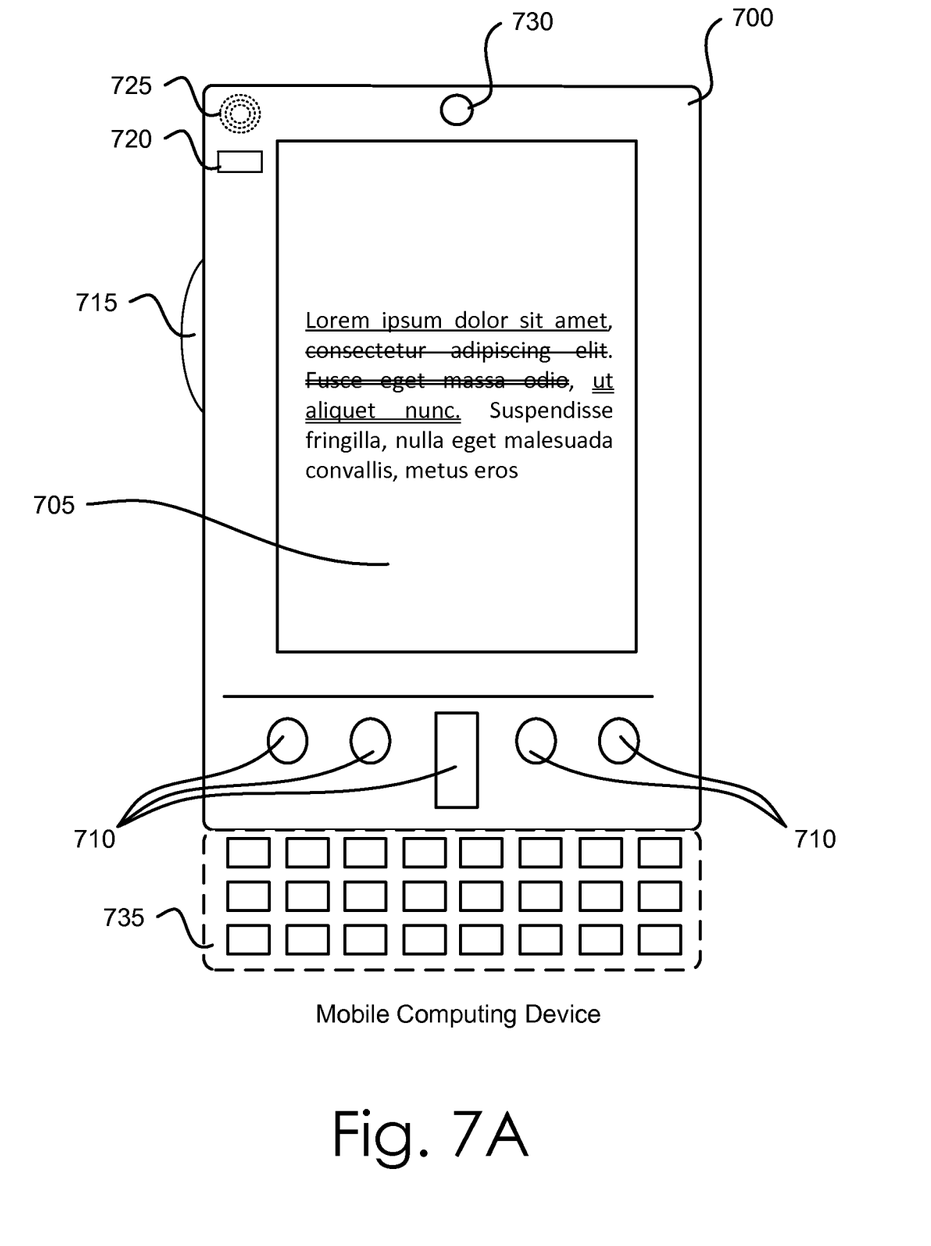
FIG. 7A illustrates one embodiment of a mobile computing device executing one embodiment of the vector graphics classification engine.
Figure 7B:
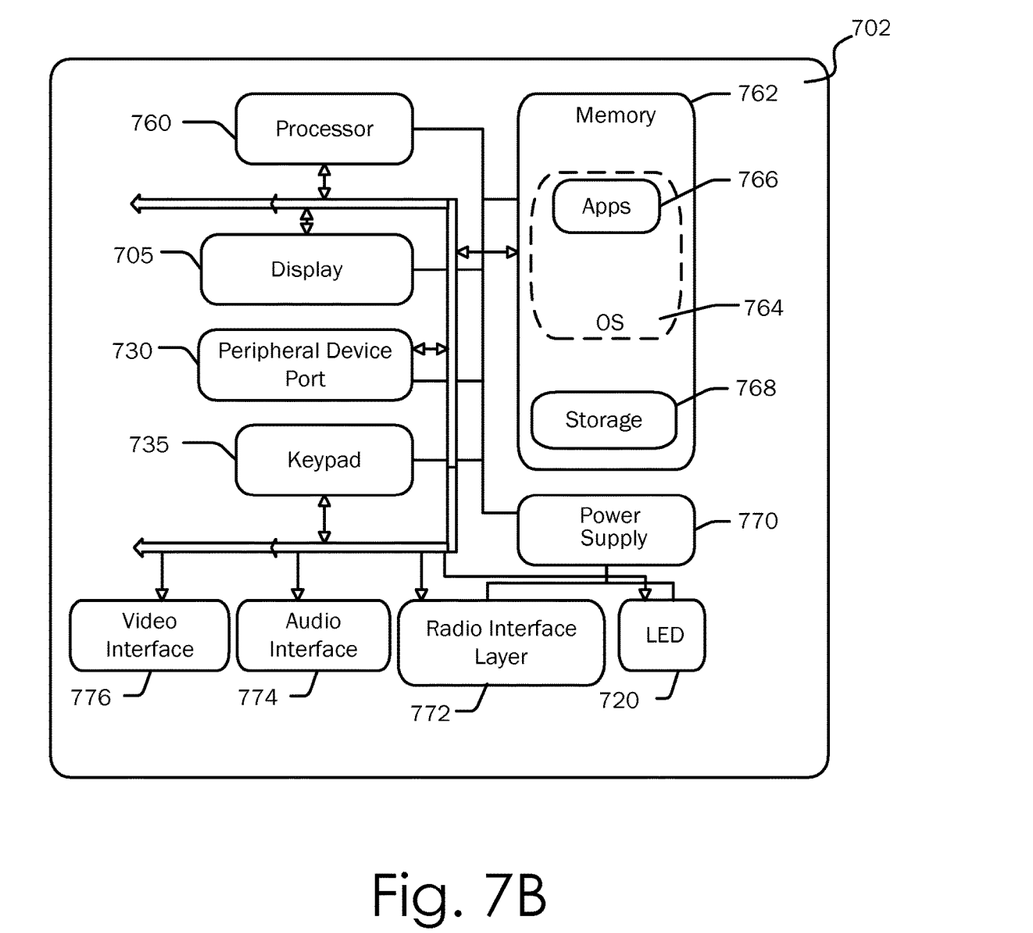
FIG. 7B is a simplified block diagram of one embodiment of a mobile computing device with which embodiments of the present invention may be practiced.
Figure 8:
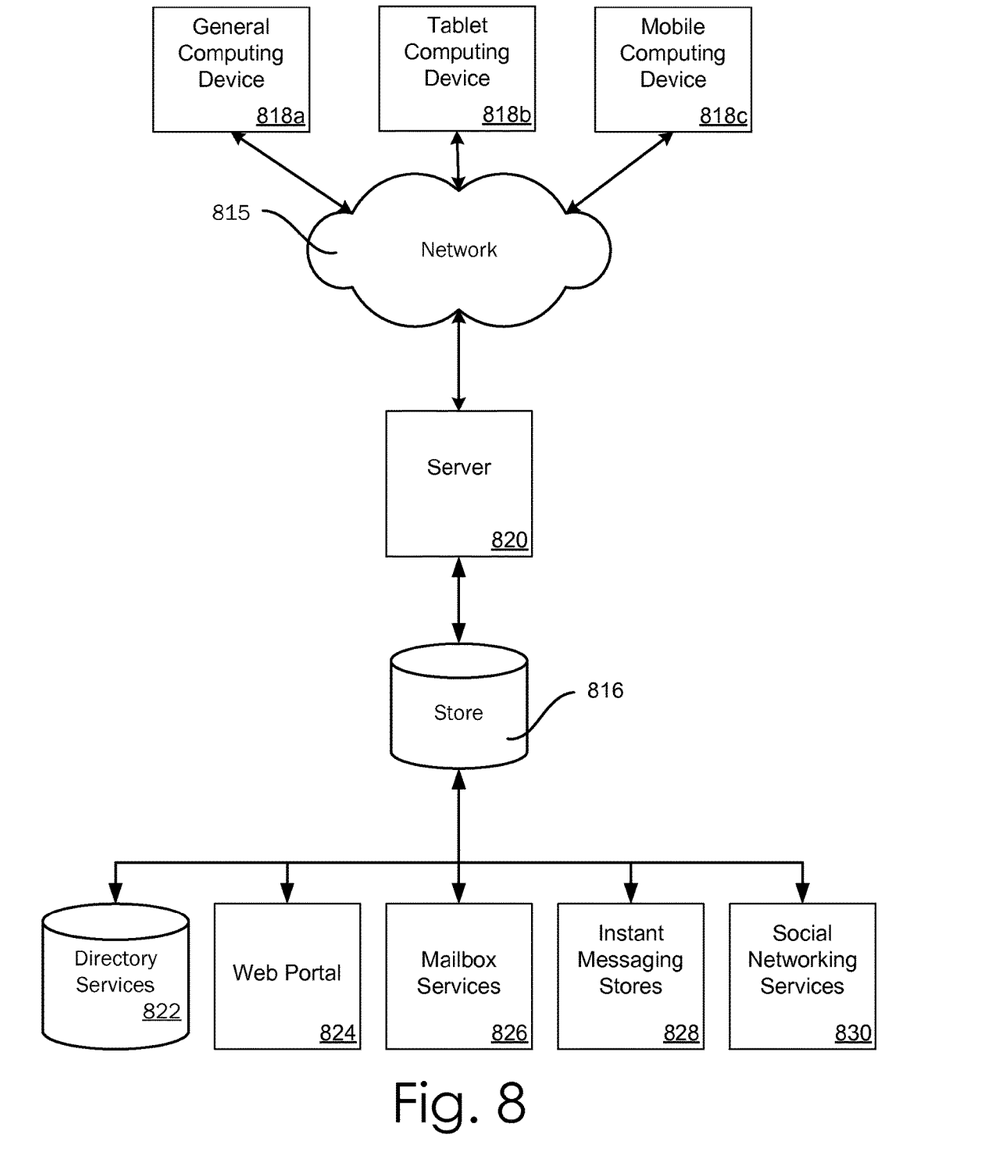
FIG. 8 is a simplified block diagram of a distributed computing system in which embodiments of the present invention may be practiced.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers. FIG. 5 illustrates an exemplary tablet computing device 500 executing an embodiment of the vector graphics classification engine 100. In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIGS. 6 through 8 and the associated descriptions provide a discussion of a variety of operating environments in which embodiments of the invention may be practiced. However, the devices and systems illustrated and discussed with respect to FIGS. 6 through 8 are for purposes of example and illustration and are not limiting of a vast number of computing device configurations that may be utilized for practicing embodiments of the invention, described herein.

FIG. 6 is a block diagram illustrating example physical components (i.e., hardware) of a computing device 600 with which embodiments of the invention may be practiced. The computing device components described below may be suitable for the computing devices described above. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program modules 606 suitable for running software applications 620 such as the vector graphics classification engine 100, the parser 110, the document processor 112, and the serializer 114. The operating system 605, for example, may be suitable for controlling the operation of the computing device 600. Furthermore, embodiments of the invention may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program modules and data files may be stored in the system memory 604. While executing on the processing unit 602, the program modules 606, such as the vector graphics classification engine 100, the parser 110, the document processor 112, and the serializer 114 may perform processes including, for example, one or more of the stages of the vector graphics classification method 400. The aforementioned process is an example, and the processing unit 602 may perform other processes. Other program modules that may be used in accordance with embodiments of the present invention may include electronic mail and contacts applications, word processing applications, spreadsheet applications, database applications, slide presentation applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the vector graphics classification engine 100, the parser 110, the document processor 112, and the serializer 114 may be operated via application-specific logic integrated with other components of the computing device 600 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 600 may also have one or more input device(s) 612 such as a keyboard, a mouse, a pen, a sound input device, a touch input device, etc. The output device(s) 614 such as a display, speakers, a printer, etc. may also be included. The aforementioned devices are examples and others may be used. The computing device 600 may include one or more communication connections 616 allowing communications with other computing devices 618. Examples of suitable communication connections 616 include, but are not limited to, RF transmitter, receiver, and/or transceiver circuitry; universal serial bus (USB), parallel, or serial ports, and other connections appropriate for use with the applicable computer readable media.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process.

The term computer readable media as used herein may include computer storage media and communication media. Computer storage media may include volatile and nonvolatile, removable and non-removable media implemented in any method or technology for storage of information, such as computer readable instructions, data structures, program modules, or other data. The system memory 604, the removable storage device 609, and the non-removable storage device 610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by the computing device 600. Any such computer storage media may be part of the computing device 600.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 7A and 7B illustrate a mobile computing device 700, for example, a mobile telephone, a smart phone, a tablet personal computer, a laptop computer, and the like, with which embodiments of the invention may be practiced. With reference to FIG. 7A, an exemplary mobile computing device 700 for implementing the embodiments is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included, an optional side input element 715 allows further user input. The side input element 715 may be a rotary switch, a button, or any other type of manual input element. In alternative embodiments, mobile computing device 700 may incorporate more or less input elements. For example, the display 705 may not be a touch screen in some embodiments. In yet another alternative embodiment, the mobile computing device 700 is a portable phone system, such as a cellular phone. The mobile computing device 700 may also include an optional keypad 735. Optional keypad 735 may be a physical keypad or a "soft" keypad generated on the touch screen display. In various embodiments, the output elements include the display 705 for showing a graphical user interface (GUI), a visual indicator 720 (e.g., a light emitting diode), and/or an audio transducer 725 (e.g., a speaker). In some embodiments, the mobile computing device 700 incorporates a vibration transducer for providing the user with tactile feedback. In yet another embodiment, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one embodiment of a mobile computing device. That is, the mobile computing device 700 can incorporate a system (i.e., an architecture) 702 to implement some embodiments. In one embodiment, the system 702 is implemented as a "smart phone" capable of running one or more applications (e.g., browser, e-mail, calendaring, contact managers, messaging clients, games, and media clients/players). In some embodiments, the system 702 is integrated as a computing device, such as an integrated personal digital assistant (PDA) and wireless phone.

One or more application programs 766 may be loaded into the memory 762 and run on or in association with the operating system 764. Examples of the application programs include phone dialer programs, e-mail programs, personal information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the mobile computing device 700, including the vector graphics classification engine 100, the parser 110, the document processor 112, and the serializer 114 described herein.

The system 702 has a power supply 770, which may be implemented as one or more batteries. The power supply 770 might further include an external power source, such as an AC adapter or a powered docking cradle that supplements or recharges the batteries.

The system 702 may also include a radio 772 that performs the function of transmitting and receiving radio frequency communications. The radio 772 facilitates wireless connectivity between the system 702 and the "outside world", via a communications carrier or service provider. Transmissions to and from the radio 772 are conducted under control of the operating system 764. In other words, communications received by the radio 772 may be disseminated to the application programs 766 via the operating system 764, and vice versa.

The radio 772 allows the system 702 to communicate with other computing devices, such as over a network. The radio 772 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

This embodiment of the system 702 provides notifications using the visual indicator 720 that can be used to provide visual notifications and/or an audio interface 774 producing audible notifications via the audio transducer 725. In the illustrated embodiment, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with embodiments of the present invention, the microphone may also serve as an audio sensor to facilitate control of notifications, as will be described below. The system 702 may further include a video interface 776 that enables an operation of an on-board camera 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768. Computer storage media may include volatile and nonvolatile, removable and non-removable media implemented in any method or technology for storage of information, such as computer readable instructions, data structures, program modules, or other data.

Data/information generated or captured by the mobile computing device 700 and stored via the system 702 may be stored locally on the mobile computing device 700, as described above, or the data may be stored on any number of storage media that may be accessed by the device via the radio 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio 772 or via a distributed computing network. Similarly, such data/information may be readily transferred between computing devices for storage and use according to well-known data/information transfer and storage means, including electronic mail and collaborative data/information sharing systems.

FIG. 8 illustrates one embodiment of the architecture of a system for providing the vector graphics classification engine 100, the parser 110, the document processor 112, and the serializer 114 to one or more client devices, as described above. Content developed, interacted with or edited in association with the vector graphics classification engine 100, the parser 110, the document processor 112, and the serializer 114 may be stored in different communication channels or other storage types. For example, various documents may be stored using a directory service 822, a web portal 824, a mailbox service 826, an instant messaging store 828, or a social networking site 830. The vector graphics classification engine 100, the parser 110, the document processor 112, and the serializer 114 may use any of these types of systems or the like for enabling data utilization, as described herein. A server 820 may provide the vector graphics classification engine 100, the parser 110, the document processor 112, and the serializer 114 to clients. As one example, the server 820 may be a web server providing the vector graphics classification engine 100, the parser 110, the document processor 112, and the serializer 114 over the web. The server 820 may provide the vector graphics classification engine 100, the parser 110, the document processor 112, and the serializer 114 over the web to clients through a network 815. By way of example, the client computing device 818 may be implemented as the computing device 600 and embodied in a personal computer 818a, a tablet computing device 818b and/or a mobile computing device 818c (e.g., a smart phone). Any of these embodiments of the client computing device 818 may obtain content from the store 816. In various embodiments, the types of networks used for communication between the computing devices that make up the present invention include, but are not limited to, an internet, an intranet, wide area networks (WAN), local area networks (LAN), and virtual private networks (VPN). In the present application, the networks include the enterprise network and the network through which the client computing device accesses the enterprise network (i.e., the client network). In one embodiment, the client network is part of the enterprise network. In another embodiment, the client network is a separate network accessing the enterprise network through externally available entry points, such as a gateway, a remote access protocol, or a public or private internet address.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the claimed invention and the general inventive concept embodied in this application that do not depart from the broader scope.

What is claimed is:

1. A method for converting a fixed format document containing vector graphics and fixed format text into a flow format document, the method comprising the acts of:
   detecting fixed format text on a page of a fixed format document;
   detecting one or more vector paths on the page of the fixed format document;
   aggregating the one or more vector paths associated with the fixed format text into one or more lines;
   classifying the aggregated vector paths as one or more characteristics that are associated with the fixed format text;
   displaying on a page of a flow format document the fixed format text as flowable text having the one or more characteristics associated with the fixed format text; and
   displaying any of the detected vector paths not associated with the fixed format text as one or more graphical elements in the flow format document.

2. The method of claim 1 characterized in that the act of detecting one or more vector paths on the page of the fixed format document further comprises the act of detecting that the one or more vector paths are shape in a position proximate to detected fixed format text on the page.

3. The method of claim 1 characterized in that the act of detecting that the one or more vector paths are a shape in a position proximate to detected fixed format text on the page further comprises the act of determining that a plurality of the one or more vector paths on the page are arranged to form a single substantially closed shape.

4. The method of claim 1 characterized in that:
   the act of detecting that the one or more vector paths are a shape in a position proximate to detected fixed format text on the page further comprises the act of detecting that the shape is an unfilled shape; and
   the act of displaying on a page of a flow format document the fixed format text as flowable text having the one or more characteristics associated with the fixed format text further comprises the act of displaying the fixed format text as flowable bordered text in the flow format document.

5. The method of claim 1 characterized in that:
   the act of detecting that the one or more vector paths are a shape in a position proximate to detected fixed format text on the page further comprises the act of detecting that the shape is a filled shape; and
   the act of displaying on a page of a flow format document the fixed format text as flowable text having the one or more characteristics associated with the fixed format text further comprises the act of displaying the fixed format text as flowable shaded text in the flow format document.

6. The method of claim 1 characterized in that the act of detecting one or more vector paths on the page of the fixed format document further comprises the act of detecting that the one or more vector paths are a line running in the same direction as and proximate to the detected fixed format text on the page.

7. The method of claim 6 characterized in that:
   the act of detecting that the one or more vector paths are a line running in the same direction as and proximate to the detected fixed format text on the page further comprises the act of detecting that the line is below the text in the fixed format document; and
   the act of displaying on a page of a flow format document the fixed format text as flowable text having the one or more characteristics associated with the fixed format text further comprises the act of displaying the the fixed format text as flowable underlined text in the flow format document.

8. The method of claim 1, wherein aggregating the one or more vector paths into one or more lines includes iteratively aggregating the vector paths within a moving window that expands to a predetermined width, wherein each of the one or more lines comprises one or more of the vector paths that fit within the predetermined width of the moving window.

9. The method of claim 1, wherein the one or more characteristics are selected from shading, borders, underlines and strikethroughs.

10. A system for converting a fixed format document containing vector graphics and text into a flow format document, the system comprising a document processor operable to:
   open a fixed format document containing one or more vector paths and fixed format text;
   aggregate the one or more vector paths associated with the fixed format text into one or more lines;
   classify the aggregated vector paths as one or more characteristics that are associated with the fixed format text; and
   display in a flow format document the fixed format text as flowable text having the one or more characteristics associated with the fixed format text.

11. The system of claim 10 characterized in that the document processor is further operable to:
    detect that the one or more vector paths appear as borders of a table on a page in the fixed format document and bound the fixed format text on the page; and
    create a multi-cell table in the flow format document.

12. The system of claim 11 characterized in that the document processor is further operable to:
    detect a portion of the fixed format text contained in a cell formed by selected vector paths from the one or more vector paths that appear as borders of the table; and
    place the fixed format text as flowable text in a corresponding cell of the multi-cell table.

13. The system of claim 10 characterized in that the document processor is further operable to convert the fixed format text appearing proximate to and above a line formed on a page of the fixed format document by the one or more vector paths running the same direction as the fixed format text into underlined flowable text.

14. The system of claim 10 characterized in that the document processor is further operable to convert the fixed format text bounded by a substantially closed shape formed by the one or more vector paths into bordered flowable text.

15. The system of claim 14 characterized in that the document processor is further operable to:
    detect that the fixed format text is a paragraph; and
    convert the fixed format text bounded by the substantially closed shape into a bordered flowable paragraph.

16. The system of claim 14 characterized in that the document processor is further operable to convert the fixed format text bounded by the substantially closed shape having a background color into shaded flowable text.

17. The system of claim 14 characterized in that the document processor is further operable to:
    detect that the fixed format text is a paragraph having a background color; and
    convert the fixed format text bounded by the substantially closed shape into a flowable paragraph with background shading.

18. The system of claim 10 characterized in that the document processor is further operable to insert the one or more vector paths not associated with the fixed format text as graphical elements in the flow format document.

19. A computer readable storage device containing computer executable instructions which, when executed by a computer, perform a method to convert a fixed format document containing vector graphics and text into a flow format document, the method comprising the acts of:
    opening a fixed format document containing vector graphics and fixed format text;
    identifying one or more vector paths associated with a run of the fixed format text;
    aggregating the one or more vector paths associated with the run of the fixed format text into one or more lines;
    classifying the aggregated vector paths as one or more characteristics that are associated with the run of the fixed format text; and
    displaying in a flow format document the run of the fixed format text as flowable text having the one or more characteristics associated with the run of the fixed format text.

20. The computer readable storage device of claim 19 characterized in that displaying in the flow format document the run of the fixed format text as flowable text having the one or more characteristics associated with the run of the fixed format text includes displaying the run of fixed format text as flowable bordered text when the one or more vector paths form an unfilled shape substantially enclosing the run of fixed format text.

21. The computer readable storage device of claim 19 characterized in that displaying in the flow format document the run of the fixed format text as flowable text having the one or more characteristics associated with the run of the fixed format text includes displaying the run of fixed format text as underlined flowable text when the one or more vector paths graphics form a line near, below, and running in the same direction as the run of fixed format text.

22. The computer readable storage device of claim 19 characterized in that displaying in the flow format document the run of the fixed format text as flowable text having the one or more characteristics associated with the run of the fixed format text includes displaying the run of fixed format text as flowable text with a background shading when the one or more vector paths form a filled shape substantially enclosing the run of fixed format text.

\* \* \* \* \*